United States Patent
Gray et al.

(10) Patent No.: US 10,968,747 B2
(45) Date of Patent: Apr. 6, 2021

(54) AIRFOIL WITH THICKENED ROOT AND FAN AND ENGINE INCORPORATING SAME

(71) Applicant: RAYTHEON TECHNOLOGIES CORPORATION, Waltham, MA (US)

(72) Inventors: Eric D. Gray, Glastonbury, CT (US); Razvan Virgil Florea, Manchester, CT (US); Mark B. Stucky, Glastonbury, CT (US); Ray-Sing Lin, Glastonbury, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 14/761,738

(22) PCT Filed: Dec. 18, 2013

(86) PCT No.: PCT/US2013/075965
§ 371 (c)(1),
(2) Date: Jul. 17, 2015

(87) PCT Pub. No.: WO2014/143283
PCT Pub. Date: Sep. 18, 2014

(65) Prior Publication Data
US 2016/0003048 A1    Jan. 7, 2016

Related U.S. Application Data

(60) Provisional application No. 61/799,316, filed on Mar. 15, 2013.

(51) Int. Cl.
*F01D 5/14* (2006.01)
*F01D 5/02* (2006.01)
*F02C 3/04* (2006.01)

(52) U.S. Cl.
CPC ............ *F01D 5/141* (2013.01); *F01D 5/02* (2013.01); *F02C 3/04* (2013.01); *F05D 2220/32* (2013.01);
(Continued)

(58) Field of Classification Search
CPC . F01D 5/141; F01D 5/288; F01D 5/18; F01D 5/147; F01D 5/142; F01D 5/143;
(Continued)

(56) References Cited

U.S. PATENT DOCUMENTS 4,712,980 A    12/1987  Gely et al.
5,137,426 A *  8/1992   Rhoda .................. C23C 4/02
                                                416/191
(Continued)

FOREIGN PATENT DOCUMENTS

EP    2372096 A2   10/2011
EP    2458153 A2   5/2012

OTHER PUBLICATIONS

International Search Report for related International Application No. PCT/US13/75965; report dated Apr. 7, 2014.
European Search Report for Application No. EP 13 87 7860.

*Primary Examiner* — Carlos A Rivera
(74) *Attorney, Agent, or Firm* — Cantor Colburn LLP

(57) ABSTRACT

In accordance with one aspect of the disclosure, an airfoil is disclosed. The airfoil may include a platform and a blade extending from the platform. The blade may have a root proximate the platform and a tip radially outward from the platform. The root may have a greater thickness than a cross-section at about a quarter-span of the blade or greater.

16 Claims, 3 Drawing Sheets

(52) U.S. Cl.
CPC ...... *F05D 2220/36* (2013.01); *F05D 2240/80* (2013.01); *F05D 2250/71* (2013.01); *Y02T 50/671* (2013.01); *Y02T 50/673* (2013.01)

(58) Field of Classification Search
CPC ... F01D 5/145; F01D 5/14; F01D 5/16; F05D 2250/71–712; F05D 2240/80; F05D 2240/30; F05D 2240/301; F05D 2220/36
See application file for complete search history.

(56) References Cited

U.S. PATENT DOCUMENTS

| | | | | |
|---|---|---|---|---|
| 5,996,336 | A * | 12/1999 | Hamedani | F01D 1/026 60/226.1 |
| 6,095,755 | A * | 8/2000 | Houston | F01D 5/288 416/224 |
| 6,857,853 | B1 * | 2/2005 | Tomberg | F01D 5/147 415/914 |
| 6,969,232 | B2 * | 11/2005 | Zess | F01D 5/145 415/191 |
| 7,497,664 | B2 * | 3/2009 | Walter | F01D 5/141 416/223 A |
| 2002/0127108 | A1 * | 9/2002 | Crall | B23K 20/129 416/213 R |
| 2005/0036890 | A1 * | 2/2005 | Tomberg | F01D 5/147 416/192 |
| 2007/0098562 | A1 * | 5/2007 | Tudor | F01D 5/20 416/236 R |
| 2007/0269313 | A1 | 11/2007 | Nadvit et al. | |
| 2011/0038710 | A1 * | 2/2011 | Kemppainen | F01D 5/288 415/115 |
| 2011/0064583 | A1 * | 3/2011 | Billotey | F01D 5/141 416/234 |
| 2012/0213631 | A1 | 8/2012 | Miller et al. | |
| 2013/0004322 | A1 * | 1/2013 | Schwarz | F01D 5/28 416/224 |
| 2013/0004323 | A1 | 1/2013 | Hansen et al. | |
| 2014/0165592 | A1 * | 6/2014 | Key | F01D 5/141 60/805 |

* cited by examiner

US 10,968,747 B2

AIRFOIL WITH THICKENED ROOT AND FAN AND ENGINE INCORPORATING SAME

This Application is a US National Stage under 35 USC § 371 of International Patent Application No. PCT/US13/75965 filed on Dec. 18, 2013, and claims priority under 35 USC § 119(e) to U.S. Provisional Patent Application Ser. No. 61/799,316 filed on Mar. 15, 2013.

STATEMENT OF GOVERNMENT INTEREST

The United States Government has certain rights in this invention pursuant to contract number NNC07CB59C between the National Aeronautics and Space Administration and United Technologies Corporation.

FIELD OF THE DISCLOSURE

The present disclosure generally relates to gas turbine engines and, more specifically, to fan blades for gas turbine engines.

BACKGROUND OF THE DISCLOSURE

Gas turbine engines are well known devices, having a plurality of rotating elements including a fan, a compressor, and a turbine, as well as a combustor and other components. The fan is rotated to draw ambient air into the engine and accelerate that air, while the compressor is rotated to compress the air entering the engine. The compressed air is then mixed with fuel and combusted in the combustor creating an exhaust which exits the engine as it expands through the turbine. As the exhaust expands through the turbine, the turbine rotates. This rotational motion is transferred via an engine shaft to the compressor and fan causing both to also rotate.

In an effort to reduce noise, emissions, and fuel burn new aircraft and engines have been developed. These new aircraft and engines designs, however, increase the ingested distortion in a boundary layer of low energy air formed on the surfaces of the aircraft or engine. These distortions are caused by an increase in thickness of the typically thin boundary layer or by an increase in the amount of this low energy air that enters the engine due to placement of the engines on the aircraft. This low energy air reduces engine efficiency and thus is undesirable. These distortions can either occur throughout the operation of the engine or aircraft, or under specific circumstances such as, but not limited to, take-off, landing, or where wind is moving in a lateral direction to that of the engine. Therefore, new features must be developed to address issues arising from this increased ingested boundary layer distortion, including high cycle fatigue and resonant stresses.

The U.S. Pat. No. 6,74,282 B2 describes a typical fan blade utilized by gas turbine engines. While effective, such fan blades do little to mitigate the new boundary layer ingested distortions, and thus new fan blades that address these difficulties are needed.

SUMMARY OF THE DISCLOSURE

In accordance with one aspect of the disclosure, an airfoil is disclosed. The airfoil may include a platform and a blade extending from the platform. The blade may have a root proximate the platform and a tip radially outward from the platform. The root may have a greater thickness than a cross-section at about a quarter-span of the blade or greater.

In a refinement, the root of the blade may have a thickness about twenty percent greater than a cross-section at about a quarter-span of the blade or greater.

In another refinement, the root of the blade may include about twenty-five percent of a radial height of the blade.

In another refinement, the airfoil may further include a transition zone between the tip and the root of the blade. The transition zone may be aerodynamically smooth.

In yet another refinement, the airfoil may further include a fillet joining the blade with the platform.

In a further refinement, the fillet may have a width that varies along an axial length of the blade.

In another further refinement, the blade may include a leading edge, a central portion, and a trailing edge. The leading edge may interact with incoming airflow before other surfaces of the blade, the trailing edge may interact with outgoing airflow, and the central portion may extend between the leading and trailing edges. The leading and trailing edges of the blade may have a steeper fillet than that of the central portion of the blade.

In accordance with another aspect of the present disclosure a fan of a gas turbine engine is disclosed. The fan may include a hub and a plurality of airfoils radially extending from the hub. Each airfoil may have a platform and a blade radially extending from the platform. The blade may have a root proximate the platform and a tip radially outward from the root of the blade. The root of the blade may be thicker than a cross-section at about a quarter-span of the blade or greater.

In a refinement, the root of the blade may have a thickness about twenty percent greater than a cross-section at about a quarter-span of the blade or greater.

In another refinement, the root of the blade may include about twenty-five percent a radial height of the blade.

In another refinement, the airfoil may further include a transition zone between the tip and the root of the blade. The transition zone may be aerodynamically smooth.

In yet another refinement, the airfoil may further include a fillet joining the blade with the platform.

In a further refinement, the blade may include a leading edge and a trailing edge. The leading edge may interact with incoming airflow before other surfaces of the blade and the trailing edge may interact with outgoing airflow. The fillet of the leading and trailing edges may have a steeper shape than that of the rest of the blade.

In yet a further refinement, the blade may include a leading portion, a central portion, and a trailing portion. The leading portion may include the leading edge and interact with incoming airflow before other surface of the blade. The trailing portion may include the trailing edge and interact with outgoing airflow. The central portion may extend between the leading and trailing portions. The leading and trailing portions o the blade may have a narrower fillet than that of the central portion of the blade.

In accordance with yet another aspect of the present disclosure, a gas turbine engine is disclosed. The engine may include a fan including an airfoil having a platform and a blade extending radially outward from the platform. The blade may have a root proximate the platform and a tip radially distant from the platform. The root of the blade may have a greater thickness than a cross-section at about a quarter-span of the blade or greater and a fillet may join the blade with the platform. The engine may further include a compressor downstream from the fan, a combustor downstream from the compressor, and a turbine downstream from the combustor.

In a refinement, the root of the blade may have a thickness about twenty-five percent greater than a cross-section at about a quarter-span of the blade or greater.

In another refinement, the root of the blade may be about twenty-five percent of a radial height of the blade.

In yet another refinement, the blade may further include a transition zone proximate the greater thickness of the root of the blade. The transition zone may be aerodynamically smooth.

In still another refinement, the fillet may have a circumferential width and the blade may have an axial length. The circumferential width of the fillet may vary along the axial length of the blade.

In a further refinement, the blade may include a leading edge, a central portion, and a trailing edge. The leading edge may interact with incoming airflow before other surfaces of the blade, the trailing edge may interact with outgoing airflow, and the central portion may extend between the leading and trailing edges. The leading and trailing edges of the blade may have a steeper fillet than that of the central portions of the blade.

These and other aspects and features of the present disclosure will be better understood in light of the following detailed description when read in light of the accompanying drawings.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION

Figure 1:
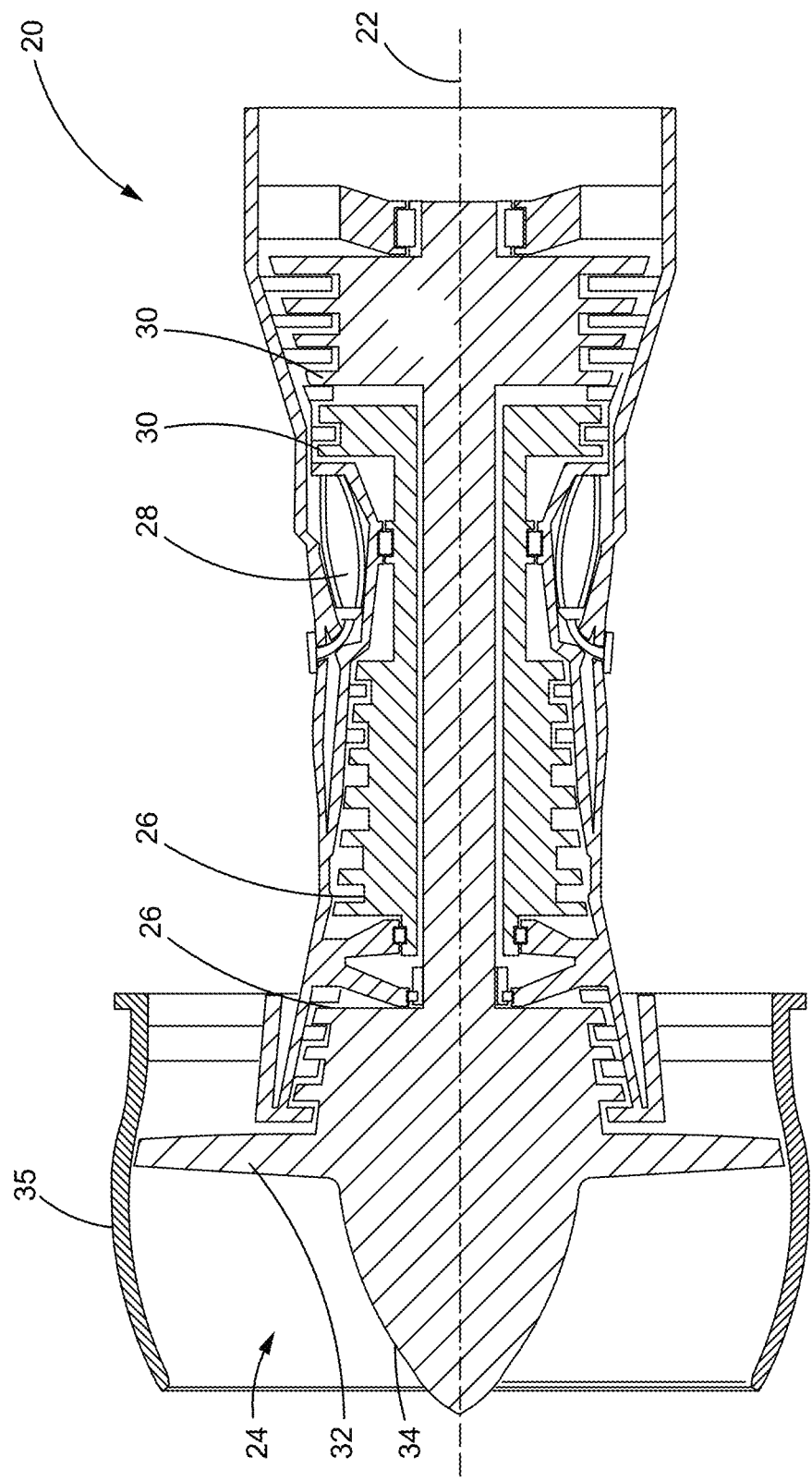
FIG. 1 is a partial sectional view of a gas turbine engine constructed in accordance with an embodiment of the present disclosure.

Referring now to the drawings and with specific reference to FIG. 1, a gas turbine engine and, more specifically, a turbofan type gas turbine engine is depicted and generally referred to by a reference numeral 20. While FIG. 1 is depicted as a turbofan engine for an aircraft, it should be understood that this is in no way limiting, but only for ease of illustration, in that any gas turbine engine is possible. Further, the structure and function of a gas turbine engine 20 are well known in the art and as such only a limited description will be provided herein.

The engine 20 is depicted in FIG. 1 as including a plurality of components axially aligned along a central axis 22. Such components include a fan 24, a dual-spool compressor 26 downstream, that is to say next in line with respect to the flow of air through the engine 20, from the fan 24, a combustor 28 downstream from the compressor 26, and a dual-spool turbine 30 downstream from the combustor 28. While the engine 20 of FIG. 1 is depicted as a dual-spool engine, it is to be understood that any configuration is possible, such as, but not limited to, single or triple spool configurations.

Figure 2:
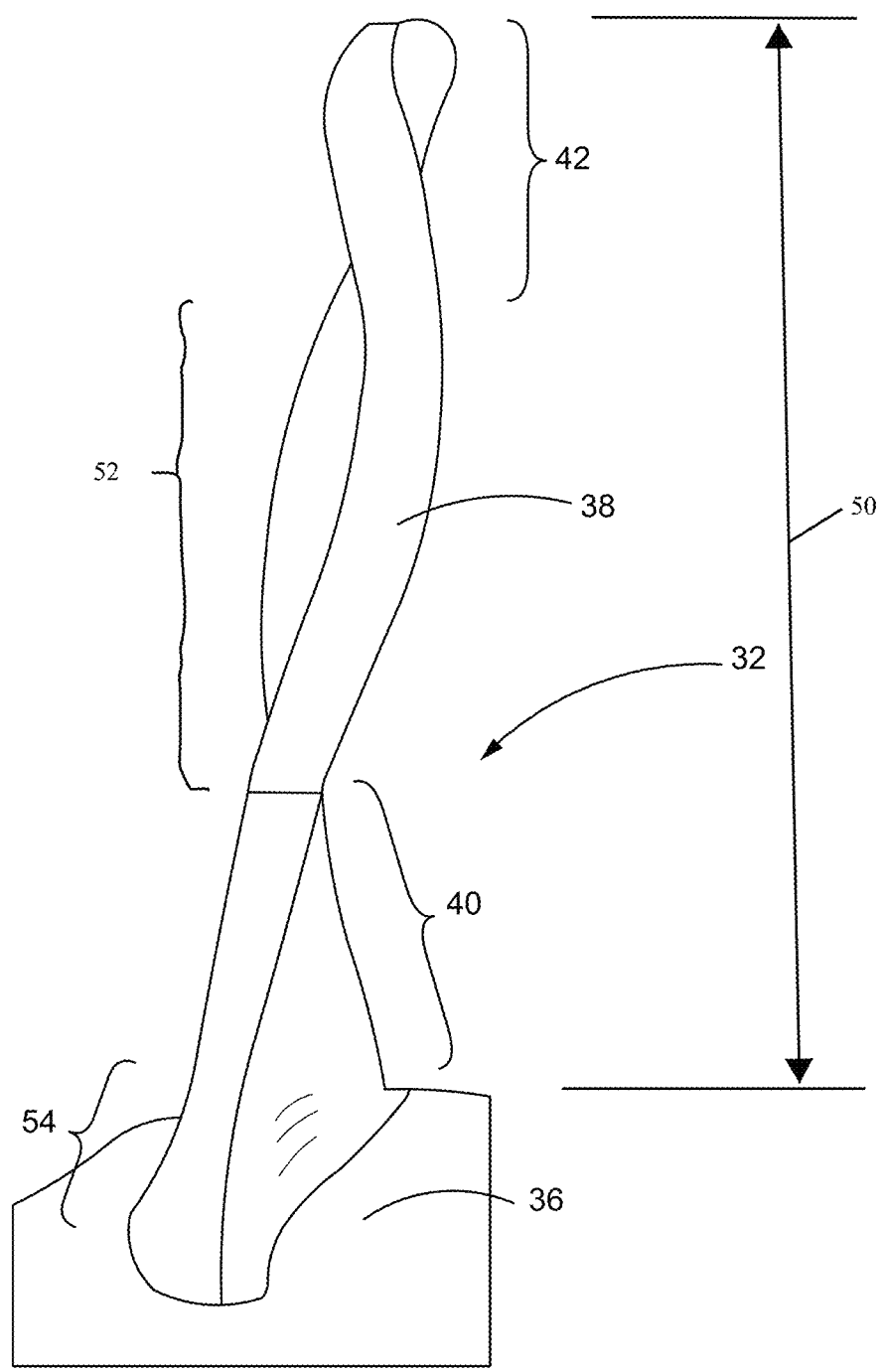
FIG. 2 is a perspective view of an airfoil constructed in accordance with an embodiment of the present disclosure.
Figure 3:
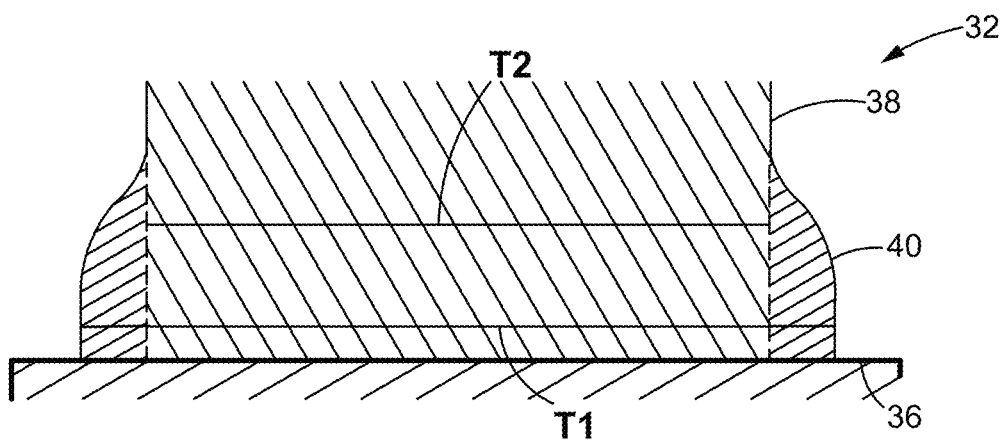
FIG. 3 is a cross-sectional view of an airfoil constructed in accordance with an embodiment of the present disclosure and detailing a thicker root without a fillet shape.
Figure 4:
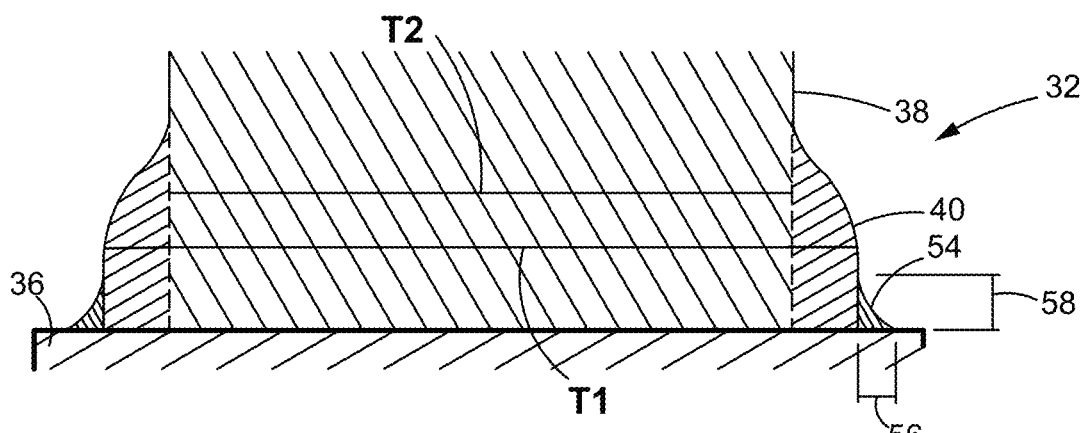
FIG. 4 is a cross-sectional view of an airfoil constructed in accordance with an embodiment of the present disclosure and detailing a thicker root and a fillet shape.

The fan 24 includes a plurality of airfoils 32 engaged with a hub 34 of the fan 24 and rotating about the central axis 22 and is surrounded by a fan case 35. As best shown in FIG. 2, each of the airfoils 32 has a platform 36 and a blade 38 radially extending outward from the platform 36. The blade 38 of the airfoil 32 has a root 40 proximate the platform 36 of the airfoil 32 and a tip 42 radially outward from the root 40 of the blade 38. The blade 38 also has a leading edge 44, which interacts with incoming air before other surfaces of the blade 38, and a trailing edge 46, which interacts with outgoing air before the air enters the compressor 26 or by-passes the rest of the engine 20. As can be seen in FIG. 3, the root 40 may have a thickness T1, while a typical cross-section radially outward from the root 40, such as at a quarter-span or greater, may have a thickness T2, with T2 being less than T1. The blade 38, as seen in FIGS. 3 and 4, may have an aerodynamically smooth transition zone 52 from the tip 42 to the root 40 as well.

One benefit of providing the root 40 with an increased thickness is that it reduces stress on the airfoil 32 as a whole, such as static, vibration, and tensile stresses, associated with the increased boundary layer ingested distortion produced by new gas turbine engine 20 and aircraft designs. This is accomplished by distributing the stresses over a larger area provided by the greater thickness T1 of the root 40. The smooth transition zone 52 also reduces air drag associated with the greater thickness T1 of the root 40 as opposed to a right angle transition from the greater thickness T1 of the root 40 to the lesser thickness T2 at around a quarter-span of the airfoil 32.

In the embodiment presented in FIG. 2, the root 40 is about twenty-five percent of a radial height 50 of the blade 38. However, this is only one exemplary embodiment, and the root 40 of the blade 38 may be modified to be a greater or lesser percentage of the radial height 50 of the blade 38 to alter the stress reduction qualities of the root 40, modify the mass distribution of the blade 38, as well as to further alter the air flow distribution on the blade 38 as desired.

The overall stress capacity of the blade 38 and the air flow distribution on the blade 38 may be modified by modifying the thickness T1 of the root 40. In one embodiment, shown in FIG. 3, the thickness T1 of the root 40 is about twenty percent larger than the thickness T2 at about a quarter-span of the blade 32. However, this is only one exemplary embodiment, and the thickness T1 of the root 40 may be greater or less than twenty percent larger than the thickness T2 at about a quarter-span of the blade 32.

Referring now to FIG. 4, the root 40 may also have a fillet 54 where the blade 38 joins the platform 36, as opposed to a right-angle transition between the platform 36 and the blade 38 as with the airfoil 32 of FIG. 3. The fillet 54 of FIG. 4 further increases the ability of the airfoil 32 to resist stresses, tensile and bending stresses for example, from the increased boundary layer ingested distortion by providing a supporting structure proximate the platform 36. A fillet 54 having an elliptical shape may provide increased reductions in the bending stresses, however, other shapes for the fillet 54 are also possible. The fillet 54 also provides an aerodynamically smooth transition zone between the platform 36 and blade 38 of the airfoil 32 reducing air drag on the airfoil 32.

Figure 5:
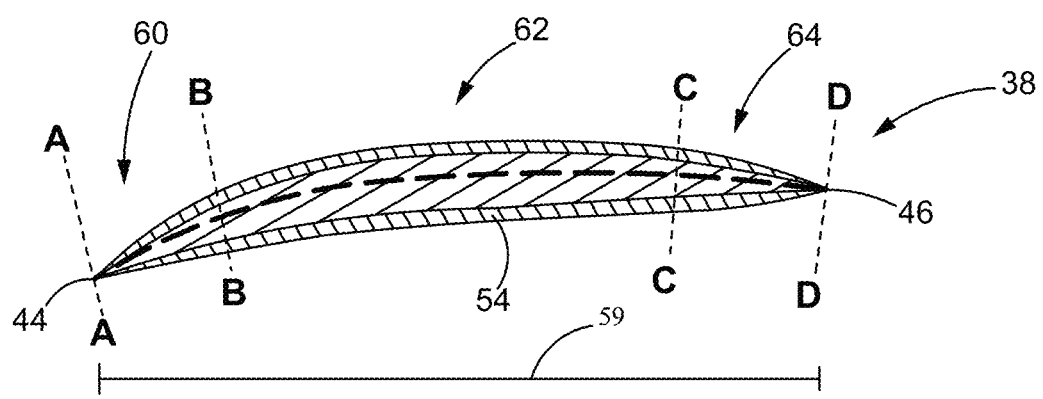
FIG. 5 is a cross-sectional view of an airfoil constructed in accordance with an embodiment of the present disclosure and detailing a varying fillet shape.

While the fillet 54 may have any desired circumferential width 56 and radial height 58, the exemplary embodiment presented in FIG. 4 illustrates the fillet 54 with an elliptical shape where the height 58 is half of a major axis and the width 56 is half of a minor axis. FIG. 5 illustrates another embodiment where the fillet 54 has a width 56 that varies with an axial length 58 of the blade 38. As can be seen from FIG. 5, the leading edge 44 of the blade 38 is located at the line marked A-A. The width 56 of the fillet 54 is at a minimum at the leading edge 44 and gradually increases in a leading portion 60 of the blade 38 to a maximum at a line marked B-B. The width 56 of the fillet 54 may remain constant in a central portion 62 of the blade 38 from the line B-B to a line marked C-C. In a trailing portion 64 of the blade 38 extending from the line C-C to the trailing edge 46 at the line D-D the width 56 of the fillet 54 gradually decreases until reaching a minimum at the trailing edge 46. The narrower width 56 at the leading portion 60 may allow the air to be split around the blade 38 easier than a wider width 56 or a blunt surface. The constant larger width 56 of the central portion 62 may allow the air to flow smoothly along the joint between the blade 38 and platform 36. The narrower width 56 of the trailing portion 64 may allow the air to recombine in controlled manner without creating pockets of swirling air downstream from the airfoil 32. Modifying this geometry may allow for the splitting and recombining features of the fillet 54 to be modified to provide a desired air flow profile as well as to further modify the enhancements provided by the greater thickness T1 of the root 40.

In one embodiment, the trailing and leading portions 60, 64 are each twenty percent of the axial length 59 of the blade 38. However, other values are also possible and may be used to create a preferential air flow distribution on the blade 38 of the airfoil 32. Modifying this percentage may allow tailoring of the growth rate of the width 56 of the fillet 54 further modifying the splitting and recombining features provided by the fillet 54.

In another embodiment the width 56 of the fillet 54 has a minimum which is a third of the maximum. However, this is only one exemplary embodiment, and the minimum width may be altered to further modify the root 40 of the blade 38 to create a preferential air flow distribution on the blade 38. This ratio between the minimum and maximum width of the fillet 54 may be modified to further enhance the splitting and recombining features provided by the fillet 54. A smaller ratio may increase the air splitting and recombining potential of the fillet 54 but may structurally weaken the fillet 54 as the fillet becomes to small at the leading and trailing edge 44, 46. A larger ratio, on the other hand, may increase the structural integrity of the leading and trailing edges 44, 46 but may reduce the air splitting and recombining potential of the fillet 54 as the leading and trailing edges 44, 46 become blunt.

While the preceding description has been directed towards an airfoil for a fan, one skilled in the art will see that the present invention may also be used in conjunction with any other airfoil such as, but not limited to, rotor or stator airfoils for compressors or turbines.

INDUSTRIAL APPLICABILITY

From the foregoing, it can be seen that the technology disclosed herein has industrial applicability in a variety of settings such as, but not limited to, reducing the effects of increased boundary layer ingested distortion caused by new gas turbine engine and aircraft technology. This may be accomplished by increasing the thickness of the root of the blade with respect to the tip of the blade of each airfoil, specifically for fan airfoils. Additionally, the radial length of the root may be modified to further reduce these stresses and increase redistribution of the air flow on the blade. A fillet may also be formed between the blade and the platform for further reductions and to decrease air drag on the airfoil. These modifications and additions to the root of airfoil is also applicable to compressor and turbine rotor and stator airfoils as well.

While the present disclosure has been in reference to a gas turbine engine and an aircraft, one skilled in the art will understand that the teachings herein can be used in other applications as well, such as but not limited to industrial gas turbine engines. It is therefore intended that the scope of the invention not be limited by the embodiments presented herein as the best mode for carrying out the invention, but that the scope of the invention include all equivalents falling within the spirit and scope of the appended claims as well.

What is claimed is:

1. An airfoil, comprising:
 a platform; and
 a blade extending from the platform, the blade having a root and a tip each radially outward from the platform, the root being located between the tip and the platform and the blade has a radial height from the platform to the tip;
 wherein the root has a fillet where the blade joins the platform of the airfoil, the fillet having a width that varies along an axial length of the blade, and a cross-sectional thickness of the blade at the root is greater than a cross-sectional thickness of the blade along at least 75% of the radial height of the blade as defined from the tip to the platform; and
 wherein the blade includes a leading edge, a trailing edge and a central portion, the central portion between the leading edge and the trailing edge, the leading edge interacting with incoming airflow before other surfaces of the blade, the trailing edge interacting with outgoing airflow, and the width of the fillet at the leading edge and the trailing edge of the blade is less than the width of the fillet at the central portion.

2. The airfoil of claim 1, wherein the cross-sectional thickness of the root of the blade is twenty percent greater than a cross-section thickness of the blade along at least 75% of the radial height of the blade.

3. The airfoil of claim 1, wherein the root of the blade includes about twenty-five percent of the radial height of the blade.

4. The airfoil of claim 1, further including a transition zone between the tip and the root of the blade.

5. The airfoil of claim 1, wherein the fillet has an elliptical shape and a height of the fillet is half of a major axis of the fillet and the width is half of a minor axis of the fillet.

6. The airfoil of claim 1, wherein the central portion extends from the leading edge to the trailing edge.

7. A fan of a gas turbine engine, comprising:
 a hub; and
 a plurality of airfoils radially extending from the hub, each airfoil having a platform and a blade extending from the platform, the blade having a root and a tip each radially outward from the platform;
 wherein the root has a fillet where the blade joins with the platform, the root being located between the tip and the platform and the blade has a radial height from the platform to the tip, wherein a cross-sectional thickness of the blade at the root is greater than a cross-sectional thickness of the blade along at least 75% of the radial height of the blade as defined from the tip to the platform; and wherein the blade includes a leading edge and a trailing edge, the leading edge interacting with incoming airflow before other surfaces of the blade and the trailing edge interacting with outgoing airflow, and the fillet has a width in an axial direction of the blade at the leading edge and the trailing edge, wherein the width of the fillet at the leading edge and the trailing edge is less than a width of the fillet in an axial direction of the fillet located between the leading edge and the trailing edge.

8. The fan of claim 7, wherein the cross-sectional thickness of the root of the blade is twenty percent greater than a cross-section thickness of the blade along at least 75% of the radial height of the blade.

9. The fan of claim 7, wherein the root of the blade is about twenty-five percent of the radial height of the blade.

10. The fan of claim 7, wherein the airfoil further includes a transition zone between the tip and the root of the blade.

11. The fan of claim 7, wherein the blade includes a central portion, the central portion extending between the leading and trailing portions.

12. A gas turbine engine, comprising:
a fan including an airfoil having a platform and a blade extending radially outward from the platform, wherein the blade has a root and a tip each radially outward from the platform, the root being located between the tip and the platform and the blade has a radial height from the platform to the tip, wherein a cross-sectional thickness of the blade at the root is greater than a cross-sectional thickness of the blade along at least 75% of the radial height of the blade as defined from the tip to the platform, and the root has a fillet where the blade joins with the platform, wherein the fillet has a circumferential width and the blade has an axial length, the circumferential width of the fillet varying along the axial length of the blade; and wherein the blade includes a leading edge, a trailing edge and a central portion, the central portion between the leading edge and the trailing edge, the leading edge interacting with incoming airflow before other surfaces of the blade, the trailing edge interacting with outgoing airflow, and the width of the fillet at the leading edge and the trailing edge of the blade is less than the width of the fillet at the central portion;

a compressor downstream from the fan;

a combustor downstream from the compressor; and a turbine downstream from the combustor.

13. The gas turbine engine of claim 12, wherein the root of the blade has a thickness about twenty-five percent greater than the tip of the blade.

14. The gas turbine engine of claim 12, wherein the cross-sectional thickness of the root of the blade is greater than a cross sectional thickness of the blade along at least 75% of the radial height of the blade.

15. The gas turbine engine of claim 12, wherein the blade further includes a transition zone between the tip and the root of the blade.

16. The airfoil of claim 12, wherein the central portion extends from the leading edge to the trailing edge.

* * * * *